No. 885,498. PATENTED APR. 21, 1908.
F. L. MANELIK.
MEANS FOR COOLING EXPLOSIVE ENGINES.
APPLICATION FILED FEB. 4, 1907.
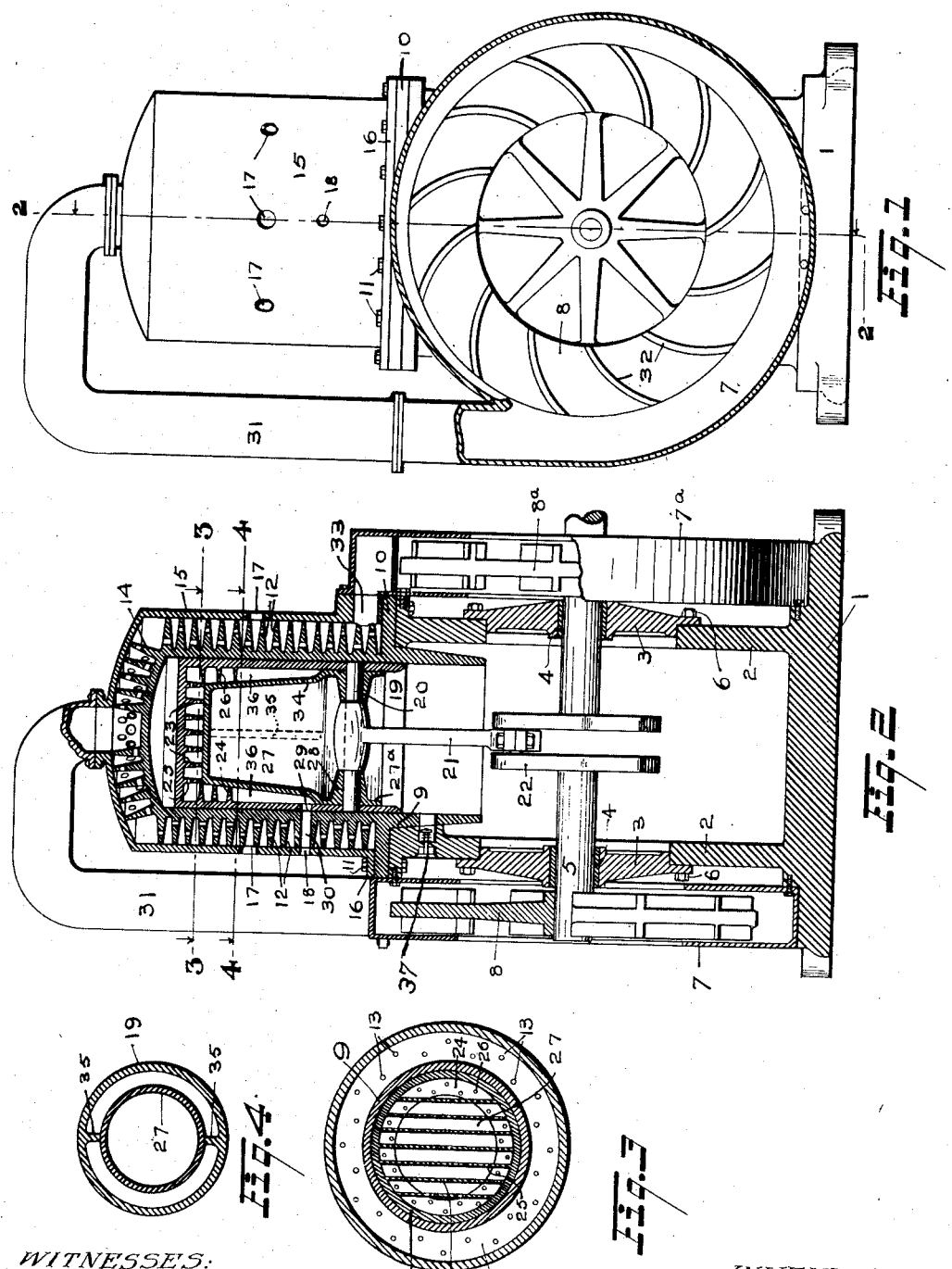
WITNESSES:
INVENTOR,
Frank L. Manelik.
By Bates, Fouts & Hull,
ATTYS.

UNITED STATES PATENT OFFICE.

FRANK L. MANELIK, OF BURTON, OHIO.

MEANS FOR COOLING EXPLOSIVE-ENGINES.

No. 885,498.    Specification of Letters Patent.    Patented April 21, 1908.

Application filed February 4, 1907. Serial No. 355,572.

*To all whom it may concern:*

Be it known that I, FRANK L. MANELIK, residing at Burton, in the county of Geauga and State of Ohio, have invented a certain new and useful Improvement in Means for Cooling Explosive-Engines, of which the following is a full, clear, and exact description, reference being had to the accompanying drawings.

My invention relates to explosive engines, such as gasolene engines, and has for its object to provide an engine of this type with means whereby the cylinder and piston may be cooled and wherein this result may be accomplished with efficiency and simplicity and economy of construction.

I attain the above results by the embodiment of my invention shown in the drawings, wherein Figure 1 represents a side elevation of so much of an engine and its parts as is necessary to show my invention. Fig. 2 represents a vertical sectional view through said engine, some of the parts being shown in elevation. Fig. 3 represents a cross-sectional view on the correspondingly-numbered line of Fig. 2. Fig. 4 represents a similar view on the line 4—4 of Fig. 2.

Describing now the parts of my mechanism by reference numerals, 1 designates the bed plate of my engine, having thereon a closed crank case, said case comprising suitable sides and ends. The ends 2 are provided with oppositely - arranged openings which are closed by bearing plates 3, having therein journals 4 for the shaft 5. Bearing plates 3 are removably fitted to the ends 2, as by bolts 6, and when in place completely close the crank case.

On each side of the side plates 2 are located the casings 7, 7ª, into which the opposite portions of shaft 5 project. These casings partially inclose the fly wheels 8, 8ª of the engine. The casings for the fly wheels may be made of light metal suitably bolted to the bed plate and to the side plates 2. Each of the casings is open at the central portion thereof, to provide a suitable inlet for air, for a purpose to be hereinafter described.

The cylinder 9 of the engine is supported on top of the crank case, as by means of lateral flanges 10 resting on the top of said case and bolts 11 extending through said flanges and the corresponding flanges on the crank case. The lower extremity of the cylinder projects downwardly into the crank case a considerable distance. The body of the cylinder is provided with numerous parallel flanges 12, preferably integral therewith and extending continuously around the outside thereof. Each flange, as will appear more particularly from Fig. 3, is provided with numerous perforations 13. The top of the cylinder is also provided with circular perforated flanges 14, said flanges being preferably integral with the top of the cylinder and being arranged concentrically thereon. The flange-provided portion of the cylinder projects above the crank case and is inclosed by a casing 15, which engages the outer edges of the flanges 12 and 14 and is suitably spaced from the body of the cylinder thereby. At its bottom or lower end the casing is provided with a lateral flange 16, resting on top of the flange 10 of the cylinder and bolted thereto, as by the bolts 11, which secure the flange 10 to the lateral flange on top of the crank case. The casing 15 is provided, about midway of the height thereof, with a series of perforations 17, for a purpose to be described hereinafter, and is also provided with one or more perforations 18, located between perforations 17 and the bottom of the casing.

Within the cylinder there is mounted the piston 19, which is of the trunk type and is suitably connected by cross pin 20 and connecting rod 21 with crank 22. The piston is provided with two series of flanges, one series 23 of which is integral with and projects downwardly from the top thereof into the interior of the trunk and the other series 24 of which is circular and projects inwardly from the inner wall of the trunk. These flanges are provided with perforations 25 and 26 respectively, as shown more particularly in Figs. 2 and 3.

27 denotes an inner casing or lining for the piston, the same being substantially frustoconical in shape and having the upper surface thereof abutting against the lower ends of flanges 23 and the upper portion of the body thereof abutting against the inner edges of the flanges 24. The shape of the casing 27 forms a space with the adjacent inner wall of the piston which decreases in width from the top of the casing towards the bottom thereof. Toward its lower end, the casing 27 is enlarged at 27ª to form an extended bearing with the adjacent portion of the piston and may be provided with integral inwardly-projecting lugs 28 for the reception of the cross-pin 20 by which it is connected to the piston. Just above the bottom of the space between the piston and casing 27, an aperture 29 is provided adapted to be brought into alinement with aperture 18. In Fig. 2, the piston is shown in the position which it occupies when at the end of its up-stroke. In this position, the aperture 29 in the wall of the piston is in alinement with the opening 18 in the outer casing 15 and with the aperture 30 extending through the wall of the cylinder. By means of a pair of oppositely-arranged ribs or flanges 35 extending between the casing 27 and the piston from the enlargement 27ª to the top of the casing, a passageway 36 is formed around and over the top of said casing and between the same and the inner surface of the piston.

31 denotes a pipe extending from the casing 7 which surrounds fly wheel 8 to the top of casing 15, being connected with the top of said casing in any suitable manner. As will appear more particularly from Fig. 1, fly wheel 8 and casing 7 are constructed to form a centrifugal fan. For this purpose the rim of the fly wheel is provided with vanes 32, and the casing 7 is eccentric with relation to said fly wheel. The lower end of pipe 31 communicates with the portion of casing 7 wherein the space formed between the same and the periphery of the fly wheel is widest. The fly wheel 8ª and its casing 7ª are similarly constructed, but the fan space formed between the latter wheel and its casing communicates with the lower end of casing 15, as through passageway 33 formed in the lower end of 15.

With the parts constructed as described the operation will be as follows: As the engine shaft rotates, the air will be forced from the centrifugal fan formed by fly wheel 8 and its casing through pipe 31 to the top of the casing 15 and will be distributed laterally in radial directions from the central portion of said casing through the apertures in the flanges 14 and the apertures in the flanges 12 on the outside of the cylinder until it reaches the apertures 17, whence it is discharged into the atmosphere. It will be observed that flanges 14 and 12 are arranged transversely to the general direction of the travel of the air from the inlets into the casing to the points of discharge therefrom. Furthermore, the perforations in adjacent flanges are staggered with respect to each other, and the aggregate area of the perforations in each flange does not exceeed the sectional area of either of the ducts 31, 33, causing the air driven into the casing 15 to be spread over the entire surface of each flange, whereby said flanges and the cylinder to which they are attached are effectively cooled. Meanwhile, air supplied by the fan formed by fly wheel 8ª and its casing 7ª will enter the lower portion of the space formed between casing 15 and the cylinder, will pass through the perforations in the flanges surrounding the body of the cylinder, and will also escape through apertures 17. It will be seen that the coolest air is supplied to the hottest portions of the cylinder, viz., to the closed or top end, where the explosion occurs, and to the lower portion where the friction between the piston and cylinder, due to the thrust of the connecting rod, is the greatest. While this operation is occurring, the piston will be cooled in the following manner: On the down stroke of the piston the air within the casing 27 and the crank case 2 will escape through check valve 37 into the atmosphere. As soon as the lower end of the piston covers the check valve, the air in the crank case will be compressed and will flow through an aperture 34 located in the wall of casing 27, just above the enlargement 27ª and on one side of ribs or flanges 35, up passageway 36, through the apertures in the flanges 24, through apertures in flanges 23, down through apertures in flanges 24 on the opposite side of ribs 35 and will escape through apertures 29, 30 and 18. On the upstroke of the piston, a partial vacuum is formed in the crank case, and when the aperture 29 is brought into alinement with apertures 30 and 18, air flows through the said apertures, upwardly through perforations in flanges 24, passageway 36 on one side of ribs or flanges 35, through the perforations in flanges 23, downwardly through the perforations in flanges 24 in passageway 36 on the other side of ribs or flanges 35 and though apertures 34 into the crank case. As is the case with flanges 12 and 14, flanges 23 and 24 are arranged transversely to the direction of travel of the air through the passageway 36 and the perforations in adjacent flanges are staggered, thus spreading the air over the entire surfaces of the flanges. It is unnecessary to extend the flanges to the lower end of the piston, as it is the upper end that is subjected to the greatest heat due to the ignition and combustion of the gases in the cylinder.

From the construction as above described, it will be apparent that I have provided effective means for cooling both the pistons and the cylinders of explosive engines, and that this result is accomplished with a minimum number of parts, making the device both positive in operation and cheap of production.

Having described my invention, I claim:

1. In an explosive engine, the combination of a shaft, a cylinder, a casing surrounding said cylinder and spaced therefrom and having an inlet and an outlet, flanges carried by said cylinder between the inlet and the outlet and projecting across the space between the cylinder and casing and having numerous fine perforations therein, the perforations of one flange being staggered with respect to those on an adjacent flange, and means for supplying air to the casing inlet, substantially as specified.

2. In an explosive engine, the combination of a shaft, a cylinder, a casing surrounding said cylinder and spaced therefrom, and having inlets communicating with both ends of such space and an outlet substantially midway between said inlets, flanges carried by said cylinder and extending across such space, the said flanges being provided with numerous perforations and the perforations in one flange, being staggered with respect to those in an adjacent flange, and means for supplying air to said inlets, substantially as specified.

3. In an explosive engine, the combination of a cylinder having a closed end, said end being provided with concentric flanges and the body of the cylinder being provided with surrounding flanges, a casing surrounding the closed end and body of said cylinder, the said flanges being provided with numerous perforations and the perforations in one flange being staggered with respect to those in an adjacent flange, and fitting against the outer ends of the flanges, said casing being provided with an inlet at the central portion of the head and within the innermost of the concentric flanges thereon and with an outlet remote from said inlet, and means for supplying air through said inlet, substantially as specified.

4. In an explosive engine, the combination of a cylinder having a closed end, said end being provided with concentric flanges and the body of the cylinder being provided with surrounding flanges, the said flanges being provided with numerous perforations and the perforations in one flange being staggered with respect to those in an adjacent flange, a casing surrounding the closed end and body of the cylinder and fitting against the outer ends of the flanges and provided with an inlet at the central portion of the head within the innermost flange thereon, and with an inlet at the opposite end thereof and an outlet intermediate between said inlets, a shaft, and means driven thereby for forcing air through said inlets, substantially as specified.

5. In an explosive engine, the combination of a cylinder, a shaft, a hollow piston within said cylinder, a closed crank case within which said shaft is mounted, and means for supplying a current of air from the case in contact with the interior of said piston on one stroke of the piston and for supplying air from the atmosphere in contact with the interior of said piston on the reverse stroke thereof, substantially as specified.

6. In an explosive engine, the combination of a closed crank case, a shaft therein, a cylinder, a hollow piston, a casing within said piston and spaced therefrom to form a passageway therewith, and means for forcing air in one direction through the passageway between the casing and piston on the stroke of the latter in one direction and for forcing air through said passageway in the reverse direction on the reverse stroke of said piston, substantially as specified.

7. In an explosive engine, the combination of a cylinder, a hollow piston, a liner for said piston forming therewith an internal passageway, and means for forcing air through said passageway, substantially as specified.

8. In an explosive engine, the combination of a cylinder, a shaft, a hollow piston, a liner for said piston forming therewith an internal passageway, means for forcing air through said passageway, and perforated flanges projecting into said passageway from said piston and arranged transversely of said passageway, substantially as specified.

9. In an explosive engine, the combination of a hollow cylinder having an aperture between the ends thereof, a closed crank case, a hollow piston in said cylinder also having an aperture in its side wall intermediate the ends thereof, a casing in said piston and forming therewith a passageway extending from the aperture in the piston around and within the closed end of the same, said casing having an aperture establishing communication between the passageway and the crank case, substantially as specified.

10. In an explosive engine, the combination of a cylinder having an aperture between the ends thereof, a closed crank case, a hollow piston in said cylinder also having an aperture in its side wall intermediate the ends thereof, a casing in said piston and forming therewith a passageway extending from the aperture in the piston around and within the closed end of the same, said casing having an aperture establishing communication between the end of the passageway opposite the former aperture and the crank case, and perforated flanges carried by said piston and extending transversely of said passageway, substantially as specified.

11. In an explosive engine, the combination of a cylinder, a hollow piston therein, a casing within said piston and forming therewith a passageway, perforated flanges interposed between said casing and piston, and means for causing air to flow in opposite directions through said passageway and the perforations in the flanges, substantially as specified.

12. In an explosive engine, the combination of a cylinder, a piston therein, a casing within said piston and forming therewith a passageway, perforated flanges interposed between casing and piston, and means for causing air to flow in alternately opposite directions through said passageway and the perforations in the flanges, substantially as specified.

13. In an explosive engine, the combination of a closed crank case, a cylinder, a piston therein, perforated flanges projecting inwardly from the closed end of the piston, perforated flanges projecting inwardly from the hollow body of the piston, a casing within said piston spaced from the closed end portion thereof and forming therewith a passageway, said casing having an aperture establishing communication between one end of said passageway and the crank case, said piston and cylinder having perforations or apertures adapted to be brought into line to establish communication between the opposite end of said passageway and the atmosphere, substantially as specified.

14. In an explosive engine, the combination of a closed crank case, a cylinder, a piston therein, perforated flanges projecting inwardly from the closed end of the piston, perforated flanges projecting inwardly from the hollow body of the piston, a casing within said piston spaced from the closed end portion thereof and forming therewith a passageway, said casing having a perforation establishing communication between one end of said passageway and the crank case, said piston and cylinder having perforations or apertures adapted to establish communication between the opposite end of said passageway and the atmosphere when the piston is at or near the end of its stroke in one direction and a check valve in the crank case adapted to be closed by the piston before it reaches the end of its stroke in the opposite direction, substantially as specified.

15. In an explosive engine, the combination of a cylinder, a hollow piston therein, a casing within said piston and forming therewith a passageway at the closed end of the piston, and means for automatically forcing air through said passageway by the movement of the piston, substantially as specified.

16. In an explosive engine, the combination of a cylinder, a hollow piston therein, a casing within said piston and forming therewith a passageway at the closed end of the piston, perforated flanges extending transversely of said passageway, and means for automatically forcing air through said passageway by the movement of the piston, substantially as specified.

In testimony whereof, I hereunto affix my signature in the presence of two witnesses.

FRANK L. MANELIK.

Witnesses:
W. C. MUMARD,
W. C. WALTER.